United States Patent [19]
Aastuen et al.

[11] Patent Number: 5,699,139
[45] Date of Patent: Dec. 16, 1997

[54] LIQUID CRYSTAL DEVICE HAVING PRESSURE RELIEF STRUCTURE

[75] Inventors: David J. W. Aastuen, Farmington; Robert P. Wenz, Woodbury, both of Minn.

[73] Assignee: Minnesota Mining and Manufacturing Company, St. Paul, Minn.

[21] Appl. No.: 498,319

[22] Filed: Jul. 5, 1995

[51] Int. Cl.⁶ .................................................. G02F 1/1339
[52] U.S. Cl. ............................................................. 349/156
[58] Field of Search ............................ 359/82; 349/155, 349/156, 158, 160

[56] References Cited

U.S. PATENT DOCUMENTS

| | | | |
|---|---|---|---|
| 4,386,293 | 5/1983 | Waldron | 359/82 |
| 4,682,858 | 7/1987 | Kanbe et al. | 359/82 |
| 4,976,516 | 12/1990 | Carrington | 359/62 |
| 5,268,782 | 12/1993 | Wenz et al. | 359/82 |
| 5,307,190 | 4/1994 | Wakita et al. | 359/82 |
| 5,399,390 | 3/1995 | Akins | 349/158 |

FOREIGN PATENT DOCUMENTS

| | | | |
|---|---|---|---|
| 4-013116 | 1/1992 | Japan | 359/82 |
| 5142548 | 6/1993 | Japan . | |
| 6202122 | 7/1994 | Japan . | |

OTHER PUBLICATIONS

"Table III.—Shear, Moment, and Deflection Formulas for Beams; Reaction Formulas for Rigid Frames, Equation 33," *Formulas for Stress and Strain*, Roark, 4th Edition, McGraw-Hill Book Company, New York (1965), p. 113.

"Pressure Effects in Sealed Liquid-Crystal Cells," *Introduction to Liquid Crystals*, Priestly et al., Plenum Press, New York and London (1974, 1975), pp. 235–240.

*Primary Examiner*—William L. Sikes
*Assistant Examiner*—Walter J. Malinowski
*Attorney, Agent, or Firm*—Gary L. Griswold; Walter N. Kirn; H. Sanders Gwin, Jr.

[57] ABSTRACT

A liquid crystal display (LCD) having an active area for display of information and an inactive area adjacent the active area. The inactive area includes a pressure relief region for relieving pressure generated within the cell, thereby minimizing the effects of pressure variation in the active area. The display is comprised of two substrates, at least one of which is flexible, which are joined at their peripheries. A plurality of spacer members placed between the substrates insures a uniform gap between the substrates in the active area. The spacer members are preferably attached to both of the substrates in the active area, but to at most one of the substrates in the inactive area. The pressure relief region serves to relieve pressure within the display (usually caused by temperature changes) by flexure of the flexible substrate, thereby eliminating distortions within the active area. The flexure of the flexible substrate is enhanced by thinning the substrate in the pressure relief region, or by the incorporation of an edge spacer member which serves to prevent attachment of the spacer members to both of the substrates in the pressure relief region.

17 Claims, 4 Drawing Sheets

LIQUID CRYSTAL DEVICE HAVING PRESSURE RELIEF STRUCTURE

FIELD OF THE INVENTION

This invention relates to liquid crystal displays, and in particular to liquid crystal displays having features designed to relieve pressure variations within the displays.

BACKGROUND OF THE INVENTION

Liquid crystal displays (LCDs) are comprised of many picture elements (pixels) which can be individually activated. Activation involves changes in the orientation of the liquid crystal in an active area of the cell caused by changes in the localized electric field surrounding the liquid crystal material in individual pixel areas. The active area has inactive regions associated with it, including areas on the edges of the display where bonding, electrical connection, or encapsulation of the display takes place. By creating localized electric field regions, pixel areas can appear either dark, light, or in-between.

The localized electric fields are generated across the face of the LCD display by thin electrodes placed on the inner surfaces of the two substrates which comprise the faces of the display. These electrodes should be transparent to the radiation which is to pass through the display, and are typically constructed of transparent conducting oxides such as indium-tin-oxide (ITO). The electrodes on each of the substrates are commonly placed parallel to each other, with a narrow gap between them to ensure electrical isolation. One manner of making the LCD requires that the electrodes on one of the substrates be placed perpendicular to the electrodes on the other substrate, so that when a pair of electrodes is addressed, only the region between the crossing of the electrodes is affected by the electric field, thereby defining a pixel area.

The precise spacing between the two faces of the display confining the liquid crystal must remain constant in order to provide a display which has a uniform appearance. Variations in the spacing induces a variation in the light-dark appearance of each pixel across the face of the display. Various schemes have been devised to insure that the spacing remains constant, including the addition of precisely dimensioned spacer particles, rods, or ribs. Typically, the liquid crystal-filled space has a thickness of less than 5 µm, and the tolerance for variation in this thickness for an acceptable display should not be greater than 0.2 µm on average. It is for this reason that many displays are fabricated from glass sheets which are specially prepared to provide the necessary flatness to insure an adequately uniform display.

LCDs can be fabricated from glass plates, with edge spacers having a precise thickness used to confine the LC material between the plates. The cells are then sealed in some manner to insure that the material does not leak out or become exposed to ambient environments. The size of the LCDs made by this technique is severely limited, since the separation of the plates in the center of the display can vary due to external pressure changes on the display. The addition of spacers interior to the LC region has permitted larger displays to be fabricated. The spacers can be rigid spheres, rods, or ribs which provide support for the substrates of the LCD, while still permitting the introduction of a majority of LC material. Since these spacer materials decrease the active area of the LCD, the total fraction of the active area covered by spacer elements is kept to a minimum.

Recently, the use of plastic substrate material has been pursued for the production of LCDs. Plastic substrates offer several advantages including lighter weight, thinner displays, potential for continuous roll processing, the possibility of manufacturing flexible displays, and the potential for variable-gap gray scale displays, as disclosed in U.S. Pat. No. 5,268,782. The major problem to be overcome with plastic LCDs resides in their flexibility—the need to maintain the precise spacing between the substrates has made cell assembly difficult. One solution to this problem has been to incorporate more spacers per unit area between the two surfaces. In this manner, the span of unsupported flexible substrate is decreased and the spacing is maintained more uniformly across the display. However, an increase in the number of spacers required results in a subsequent decrease in the total active area of the LCD, reducing the brightness of the display.

Thermal or barometric variations can affect LCD performance. The LC material in the display must fill the region between the two substrates perfectly, and the variation in the spacing of the two layers must be tightly controlled. As the LCD heats up due to either absorption of light energy or by ambient conditions, the pressure within the cell begins to build. Alternatively, the internal pressure may change due to ambient barometric pressure variations which must also be accounted for. The thermal expansion of the LC material and the thermal expansion of the substrates enclosing this material may not match, creating an internal pressure increase with rising temperature. If the substrate materials are glass, the internal pressure may rise to the point where the glass distorts (changes the separation), fractures, or the encapsulating material develops a leak. If the substrate material is plastic (and therefore somewhat flexible), the portions of the substrate between the separation spacers can bow, changing the separation between the substrates. If the pressure variation becomes too great, the bonding of the separation spacers or the edge sealing can be compromised, and the LC cell can delaminate. Conversely, if the temperature or barometric pressure is lowered, a partial vacuum can be created in this region, creating bubbles within the LC material which may interfere with the display of information or otherwise damage the display.

SUMMARY OF THE INVENTION

Accordingly, the disadvantages of the prior art are overcome by the present invention by creating a pressure relief region outside of the area used to display information on the display. A liquid crystal display device is comprised of a pair of substrates, at least one of which is flexible, sealed at the peripheries of the substrates, thereby forming a cell. The interior of the cell has a plurality of spacing members affixed to both of the interior surfaces of the cell in an active area, which provide a precise separation of the two substrates forming the faces of the cell. A region adjacent the active area of the cell is designated as a pressure relief region. Spacing members may be present in the pressure relief region, affixed to at most one of the substrates. The flexible substrate in the pressure relief region can flex relative to the other substrate in response to pressure changes. These pressure changes can arise due to barometric pressure variations and internal pressure variations caused by a change in temperature of the cell. The capability of the substrate to flex in the pressure relief region may be accomplished by several methods. One method is to thin the substrate in this region. Another method is to prevent attachment of the flexible substrate in the region, over a span sufficient to relieve pressure by flexing. Another method is to increase the spacing between the two substrates in this region. Thus, the precise separation of the substrates in the active region is

BRIEF DESCRIPTION OF THE DRAWINGS

FIG. 1b shows a cross-sectional view through the line marked A—A' of the view in FIG. 1a.

FIG. 1c shows a cross-sectional view through the line marked B—B' of the view in FIG. 1a.

FIG. 2b shows a cross-sectional view through the line marked A—A' of the view in FIG. 2a.

FIG. 2c shows a cross-sectional view through the line marked B—B' of the view in FIG. 2a.

DETAILED DESCRIPTION

A liquid crystal display (LCD) device can be fabricated from rigid or flexible substrates, or a combination thereof. Rigid substrates commonly employed include flat glass plates. Flexible substrates are generally selected from polymeric materials which exhibit a desirable transparency to the radiation employed in the display.

LCD devices often include spacer elements. These spacer elements insure that the assembled cell will provide a uniform spacing between the two substrates used in the display. Uniform spacing is critical to the acceptable appearance of the display across the entire active area. The size, number, and spacing of the spacer elements will be dictated by the nature of the substrate material in consideration of the environment that the LCD display will be used. The spacer elements may be an integral part of one of the substrates which makes up the display.

The use of spacer elements becomes crucial when one or both of the substrates is fabricated from a flexible material. The cell must be sealed to protect the interior of the cell from the environment. Therefore, temperature variations in the cell due to either ambient temperature changes or absorption of light energy and subsequent conversion to heat can cause the pressure interior to the cell to increase. An increase in the pressure within a cell having a flexible substrate will cause the substrate to deform to relieve the pressure difference across the cell substrate, thereby destroying the critical uniform spacing between the two substrates. As the pressure continues to increase, the forces generated can separate the spacer elements from one or both of the substrates, causing further degeneration of the spacing uniformity.

Similarly, a decrease in the temperature of the cell, below the temperature at which the cell was sealed, can cause a contraction of the LC material, thereby decreasing the pressure interior to the cell. A decrease in the pressure within a cell having a flexible substrate can cause the substrate to deform inwardly, destroying the critical uniform spacing required between the two substrates. A limit is reached during the contraction where bubbles begin to form in the LC material to alleviate further pressure decreases.

Figure 1A:
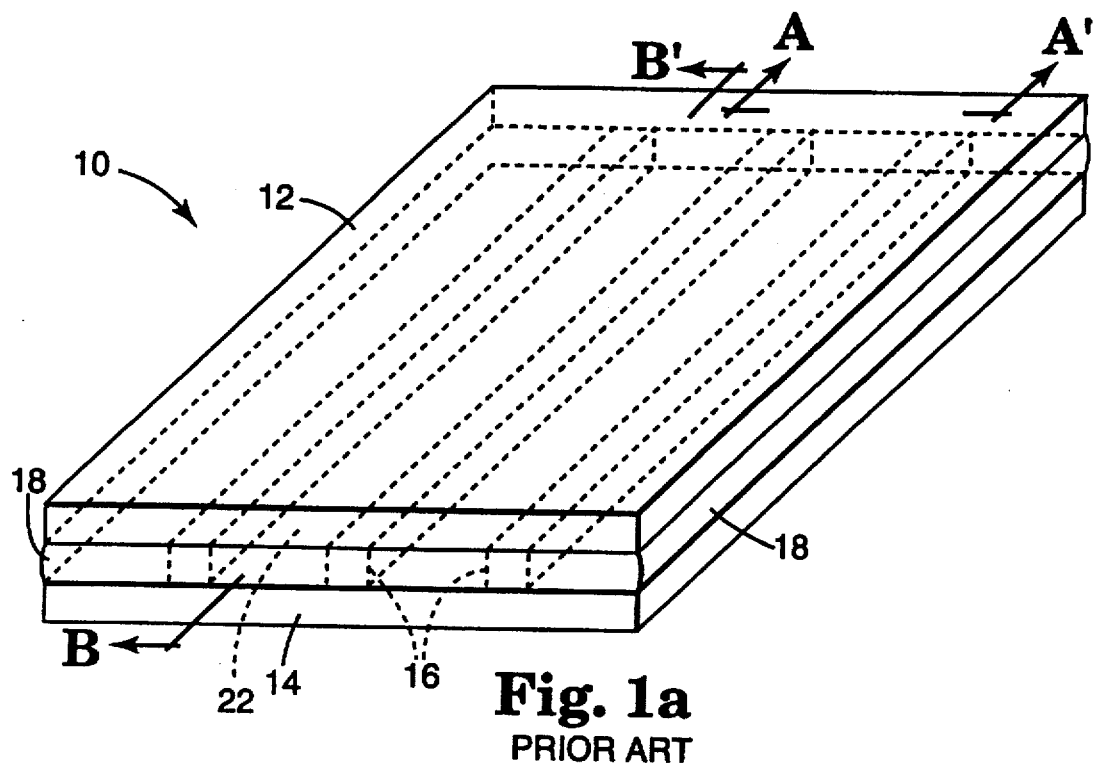
FIG. 1a shows an overhead perspective view of a prior art liquid crystal display.
Figure 1B:
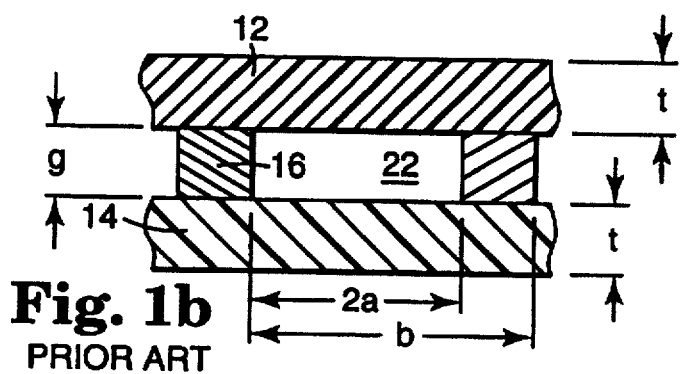
Figure 1C:
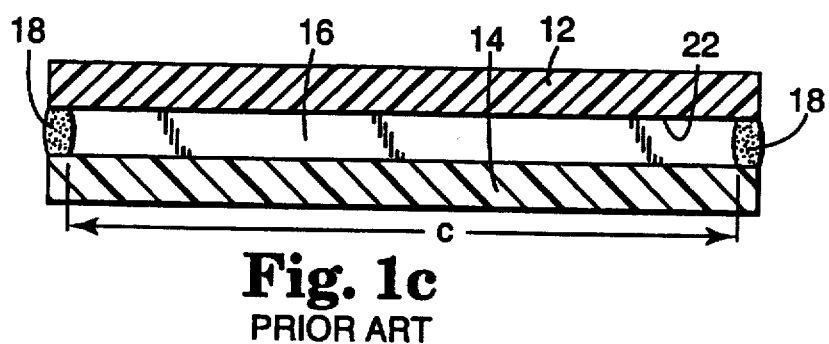

FIG. 1 shows a typical prior art liquid crystal display. In FIG. 1a, LCD 10 is comprised of front substrate 12, back substrate 14, and spacer members 16. Spacer members 16 can either be individual members affixed to front and back substrates, 12 and 14, or they can be integrally formed into one of the substrates. Edge seal 18 is formed on the periphery of the display and joins front and back substrates 12 and 14 together, sealing the interior of the display from the environment. Edge seal 18 is typically formed thermally or with adhesives. FIG. 1b shows a cross-sectional view through section A—A' of FIG. 1a, and depicts cell cavity 22 for receiving liquid crystalline material. FIG. 1c shows a cross-sectional view through section B—B' of FIG. 1a, and shows edge seal area 18. The length of spacer members 16 affixed to substrates 12 and 14 is designated by (c), the thickness of the both substrates by (t), the cell gap by (g), the spacer separation by (2a), and the pitch of the display by (b).

An expression for pressure, p, in the interior of the cell according to FIG. 1 relative to the external pressure as a function of temperature (assuming that the liquid crystal material is essentially incompressible) is given by:

$$p(T) = \max(\pi(T), -p_0) \quad\quad (I)$$
$$\text{where } \pi(T) \equiv B(T)/A$$
$$B(T) \equiv 2acg(\alpha_{LC} - 3\alpha_p)(T - T_0)$$
$$\text{and } A \equiv 16ca^3/15W\,Et^3$$

where (T) is the use temperature, ($T_0$) is the temperature at which the cell was sealed, ($p_0$) is the external pressure at which the cell was sealed, ($\alpha_{LC}$) and ($\alpha_p$) are the coefficients of thermal expansion of the liquid crystal material and of the substrate, respectively, and E is the elastic modulus of both substrates. At temperatures for which $\pi(T) \leq -p_0$, bubbles begin to nucleate within the liquid crystal material due to the low pressure in the interior of the cell. At temperatures above the seal temperature, the pressure within the cell rises above the seal pressure, generating stresses on the cell.

Equation (I) shows the influence that the geometry of the cell has on the pressure increase within the cell as a function of temperature. That portion of the LCD that makes up the active area (the area in which information is displayed) has characteristics dictated by the information to be displayed, including, for example, constraints on the cell gap and spacer separation within the cell. Other requirements such as minimum pixel size, type of liquid crystal material employed, and the overall size and shape of the active area of the display also place constraints on the cell design. We have discovered, however, that changes in the cell design outside of the active area can have a drastic influence on the pressure versus temperature performance of a cell, without compromising the active area of the cell. These changes result in a pressure relief region used to relieve pressure within the cell.

Changes of the cell design within the inactive area, which can decrease the influence that temperature or external pressure has on a cell, are related to the parameters influencing the pressure within the active area as shown in Equation (I). The separation between supporting members (spacers and edge seal), the cell gap, and the thickness of the substrates within the inactive area are altered to decrease the pressure dependence in the active area. Stresses which would normally influence the critical gap within the active area are therefore re-directed to cause changes within the inactive area. The inactive area is permitted to distort in response to pressure changes. The changes to the cell design add a minimum of additional processing steps to the assembly of the cell, and are readily implemented to produce a cell having superior thermal stability.

Figure 2A:
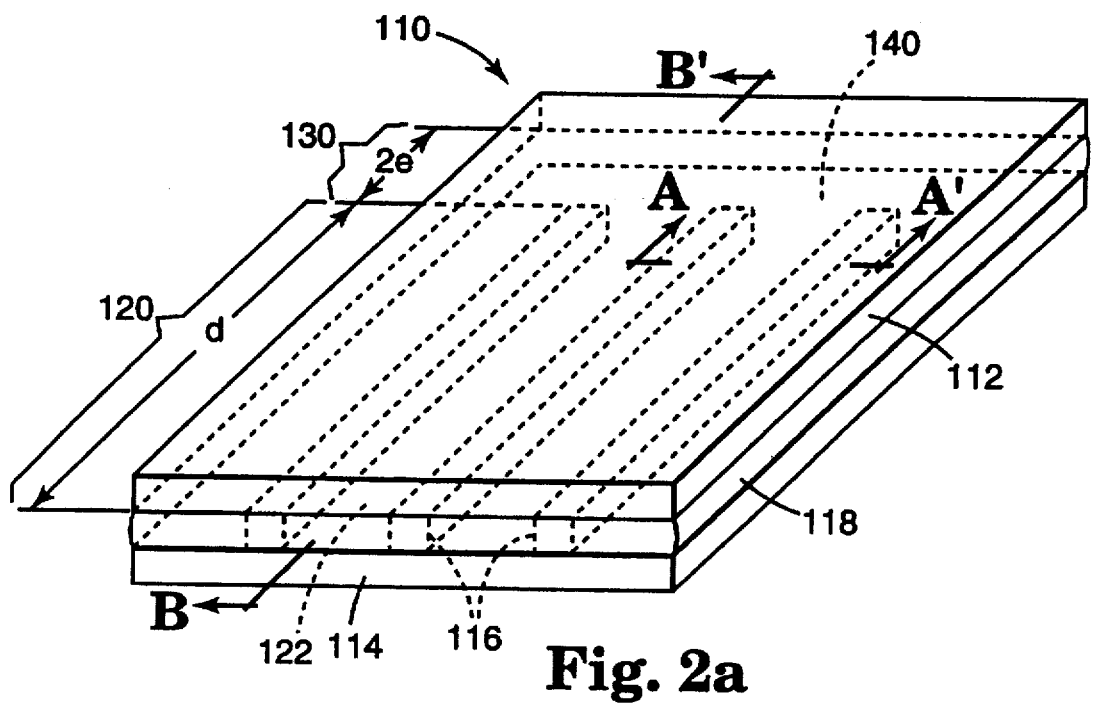
FIG. 2a shows an overhead perspective view of a liquid crystal display according to one embodiment of the invention.

FIG. 2a shows an overhead perspective view of one embodiment of the invention. LCD 110 is comprised of front substrate 112, back substrate 114, and spacer members 116. At least one of substrates 112 and 114 is flexible. Spacer members 116 can either be individual members affixed to front and back substrates 112 and 114, or they can be integrally formed into one of the substrates and affixed to the other. In a preferred embodiment, front substrate 112 is a plastic substrate having integral spacer members 116 formed thereon, and back substrate 114 is a planar plastic substrate.

LCD 110 is divided into active area 120 and inactive area 130. Active area 120 is the region where information is to be displayed on LCD 110. Spacer members 116 are absent in inactive area 130 of display 110. Pressure relief region 140 is located within inactive area 130. Edge-seal area 118 seals the interior of the display from the exterior environment and extends around the periphery of display 110. The length of spacer members 116 affixed to the substrates is designated by (d), and the width of pressure relief region 140 is designated by (2e).

Figure 2B:
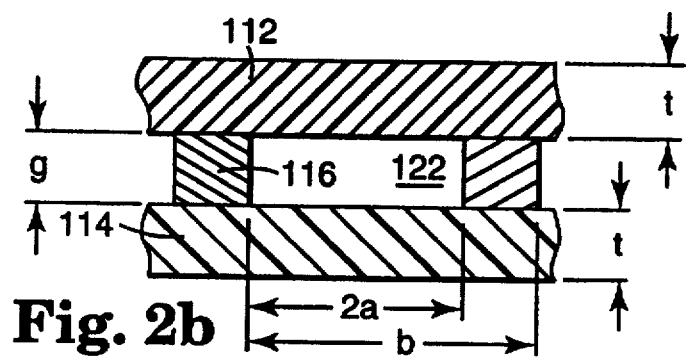
Figure 2C:
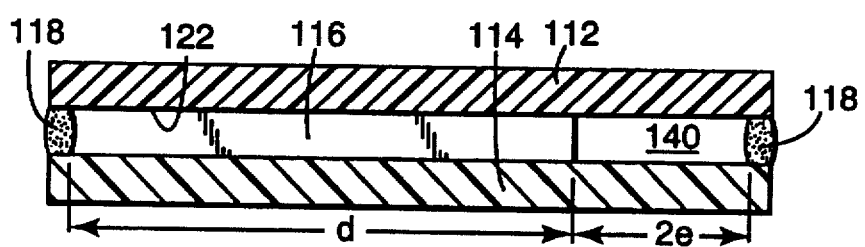

Cross-sectional views of the LCD depicted in FIG. 2a, taken along section A—A' and B—B', are depicted in FIGS. 2b and 2c, respectively. The pressure relief region has been created by removing the spacer members in the inactive area for a display having at least one flexible substrate.

Inclusion of a pressure relief region, as shown in FIG. 2, modifies Equation (I) for the pressure difference across the substrates of the LCD display. These modifications are dependent on the geometry of the region where movement of the substrates in a direction normal to the display is not constrained by the attachment of spacer members. Thus parameters (A) and (B) of Equation (I) become:

$$A \equiv 16(da^5 + be^5)/15Et^3 \quad \text{(II)}$$
$$B(T) \equiv 2(da + be)g(\alpha_{LC} - 3\alpha_p)(T - T_0)$$

A pressure change within cell cavity 122 is compensated for by distortion of substrates 112 and 114 in pressure relief region 140 located within inactive area 130. An increase in the pressure external to the cell or a decrease in the temperature of the cell will cause the substrate in the pressure relief region to distort inward, alleviating the pressure differential across the faces of the substrates and thereby decreasing distortion in the active region of the cell. The geometry of the pressure relief region is designed so that at a minimum design temperature, $T_{min}$, the parameter $\pi(T_{min})$ is greater than or equal to $-p_0$ in Equation (I). Additionally, the pressure relief region is designed so that the flexible substrates in this region do not contact one another as the pressure continues to decrease. In this manner, bubbles are prevented from forming within the display. Similarly, a decrease in the external pressure or an increase in the temperature of the cell will cause the pressure relief region to distort outward to alleviate the pressure differential across the faces of the substrates.

Figure 3A:
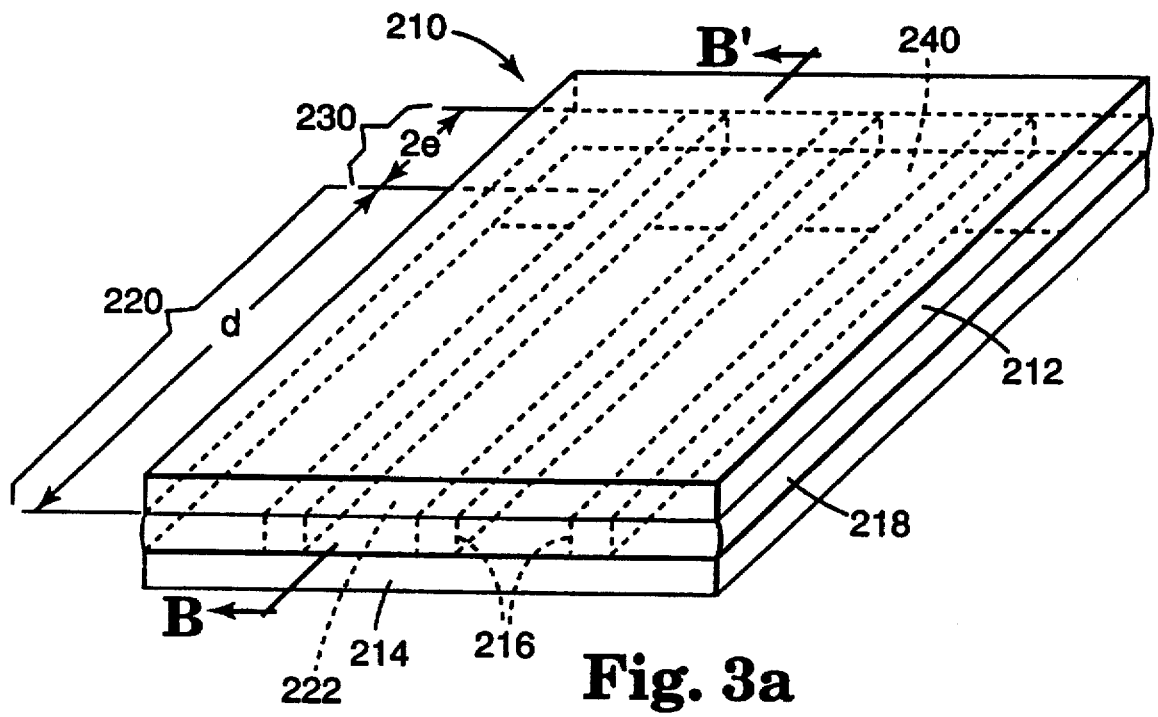
FIG. 3a shows an overhead perspective view of a liquid crystal display according to another embodiment of the invention.
Figure 3B:
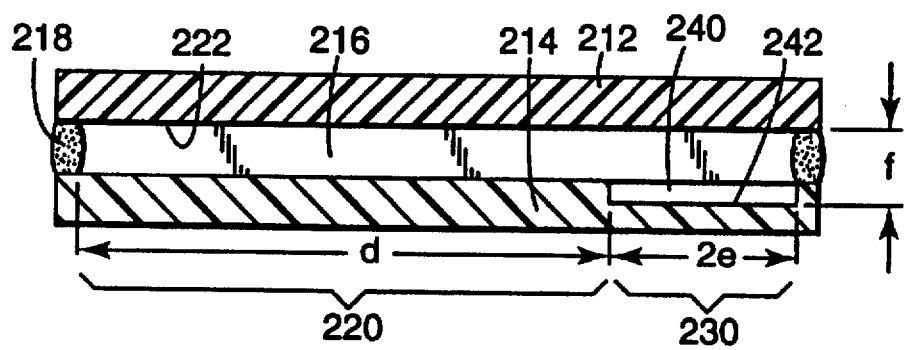
FIGS. 3b, 4, and 5 show cross-sectional views through the line marked B—B' of FIG. 3a according to other embodiments of the invention.

Another embodiment of the invention is shown in FIGS. 3a and 3b. FIG. 3a shows an overhead perspective view of a cell having a pressure relief region, and FIG. 3b shows a cross-sectional view through section B—B' of FIG. 3a. A section of back substrate 214 is thinned outside of active area 220 of display 210. Back substrate 214 is a flexible substrate. The thinning of substrate 214 may be accomplished by several means including embossing the flexible substrate to form a depression in the substrate, or by molding of the thinned feature during formation of the substrate such as in a thermally or radiation cured substrate material. Spacer members 216 may extend into pressure relief region 240, but are not affixed to the section of substrate 214 which is thinned, thereby allowing movement of substrate 214 in inactive area 230 to accommodate pressure changes. LCD 210 is comprised of front substrate 212, back substrate 214, and spacer members 216. Spacer members 216 can either be individual members affixed to front and back substrates 212 and 214, or they can be integrally formed into one of the substrates and affixed to the other. In a preferred embodiment, front substrate 212 is a plastic substrate having integral spacer members 216 formed thereon.

Pressure relief region 240 is comprised of depression 242 in back substrate 214, which serves to decrease the thickness of the substrate in this region. Cavity 222 inside the active area of the display has a length (d). The width of depression 242 in the pressure relief region is (2e), and the cell gap in the pressure relief region is (f).

In the embodiment shown in FIG. 3b, the expressions for (A) and (B) of Equation (I) become, for f<<t:

$$A \equiv 16(da^5 + be^5)/15Et^3 \quad \text{(III)}$$
$$B(T) \equiv 2(dag + bef)(\alpha_{LC} - 3\alpha_p)(T - T_0)$$

A change in the pressure within cell cavity 222 is compensated for in a manner described above. The distortion of the substrates in the pressure relief region is enhanced by the reduction of the thickness of substrate 214 in this region.

Figure 4:
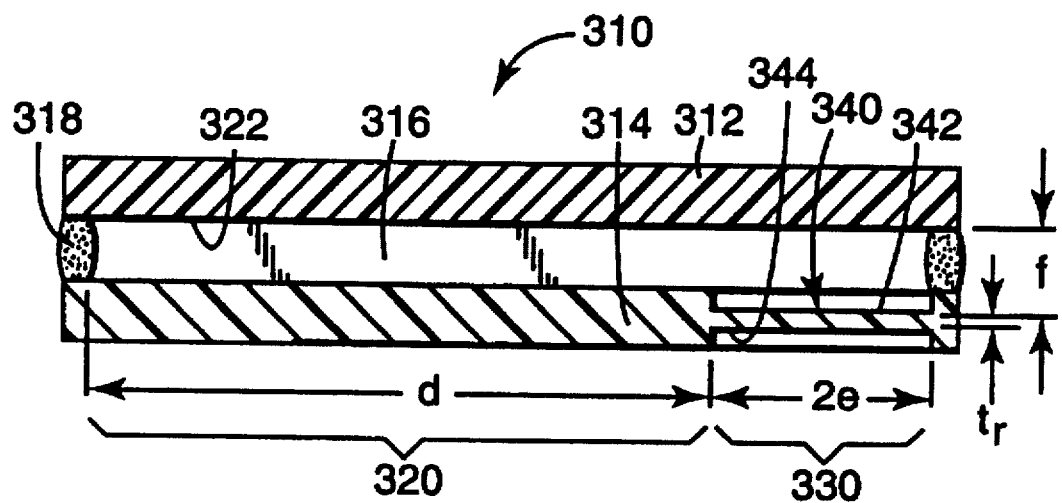

Another embodiment of the invention is shown in FIG. 4, which corresponds to a cross-sectional view through section B—B' of FIG. 3a. In FIG. 4, a section of flexible back substrate 314 is again thinned outside of active area 320 of display 310 as in the previous embodiment. The depression in substrate 314 is formed on both sides of substrate 314 in pressure relief region 340. Spacing members 316 may extend into pressure relief region 340, but should not be affixed to the section of the substrate which is thinned, thereby allowing movement of the substrate to accommodate pressure changes. First depression 342 is formed on the inner surface of back substrate 314, and second depression 344 is formed on the outer surface of back substrate 314. The cell gap in pressure relief region 340 is designated by (f), and the thickness of the back substrate in this region is designated by ($t_r$). The description of the remainder of LCD 310 follows the previous embodiment.

In the embodiment shown in FIG. 4, the expressions for (A) and (B) of Equation (I) become:

$$A \equiv 8((2da^5 + be^5)/t^3 + (be^5)/t_r^3)/15E \quad \text{(IV)}$$
$$B(T) \equiv 2(dag + bef)(\alpha_{LC} - 3\alpha_p)(T - T_0)$$

Compensation for a change in the pressure within cell cavity 322 is described in the previous embodiment. The distortion of the substrates in the pressure relief region is further enhanced by the further thinning of the substrate by addition of the second depression, without increasing the quantity of the liquid crystal material within the cell.

Figure 5:
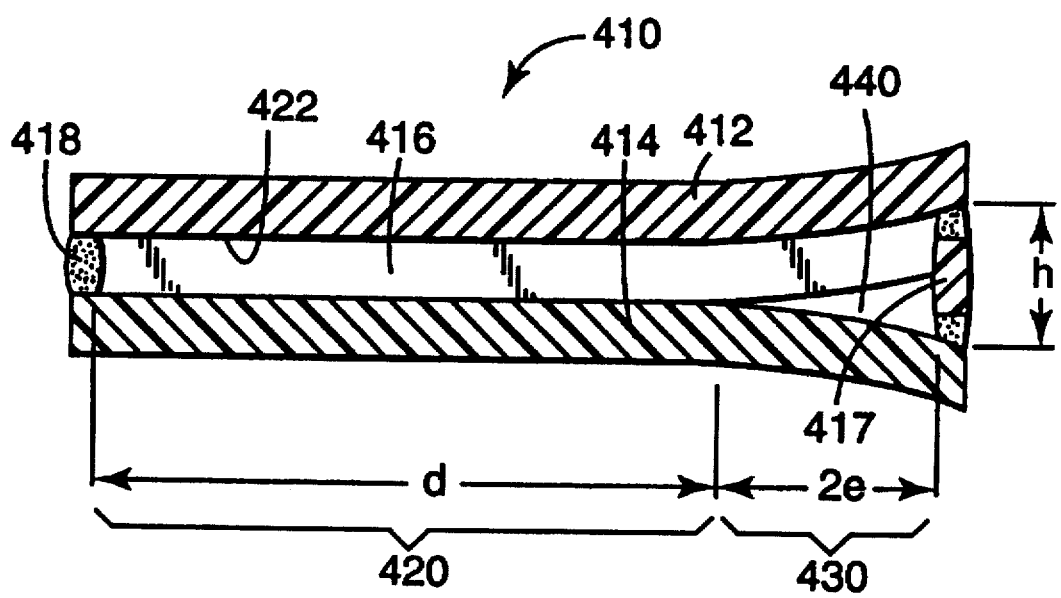

Another embodiment of the invention is shown in FIG. 5, which corresponds to a cross-sectional view through section B—B' of FIG. 3a. In FIG. 5, additional edge spacer element 417 is inserted along edge seal 418, adjacent inactive area 430 of display 410. The space between substrates 412 and 414 is increased along this edge of inactive area 430 by addition of this spacer, creating pressure relief region 440. Spacing members 416 in pressure relief region 440 are affixed to only one of the substrates. Edge spacer member 417 prevents spacer members 416 in inactive area 430 from contacting both front and back substrates 412 and 414, and creates pressure relief region 440. The cell gap (h) within pressure relief region 440 varies as a function of position within inactive area 430 of LCD 410. The description of the remainder of LCD 410 follows the previous embodiment.

The quantity of LC material filling the cell affects the volume change that accompanies the change in pressure with changing temperature of the cell. The shape and size of the depression, cavity, or reservoir formed in the flexible substrate can be optimized to decrease the total interior volume of the cell while providing sufficient flexibility of the substrate to accommodate the pressure changes. The depression, cavity or reservoir may have a rectangular or curvilinear, e.g., curved, cross-sectional profile.

The present invention will now be further illustrated by the following non-limiting examples. In the following, all measurements are approximate.

EXAMPLES

The pressure inside of an LCD cell was calculated for several different cell configurations having pressure relief structures described below. Calculated results reflect the pressure increase occurring within the cell. The pressure relief region, when included, is located adjacent to the edge seal area as depicted in the FIGURES. In all cases, the cell was constructed using two plastic flexible substrates, and the following parameters were used, unless specified otherwise:

| | | |
|---|---|---|
| $\alpha_{LC}$ | Coefficient of thermal expansion of liquid crystal material | $8.5 \times 10^{-4}/°C$ |
| $\alpha_p$ | Coefficient of thermal expansion of the polymer substrate | $6.8 \times 10^{-5}/°C$ |
| $\beta_{LC}$ | Compressibility of the liquid crystal material | 0 |
| E | Young's modulus of the polymer substrate in dyne/cm$^2$ | $2.5 \times 10^{-10}$ |
| $P_0$ | External pressure at which LCD was sealed | 1 atm |
| $T_0$ | Temperature at which LCD was sealed | 20 °C |
| $T_{min}$ | Minimum design temperature | −40 °C |
| t | Thickness of polymer substrate | 0.1 mm |
| 2a | Span between adjacent spacer members | 270 μm |
| d | Length of spacer members within active area | 10 cm |
| g | Cell gap in active area | 4.5 μm |
| f | Cell gap in pressure relief region | 4.5 μm |
| 2e | Span of pressure relief region | 10 mm |
| b | Center to center length between spacers | 0.3 mm |

Predictive Example 1 (Comparative)

An LC cell having spacer members affixed to both substrates and extending over the entire surface of the display (without a pressure relief region), according to the embodiment shown in FIG. 1, was modeled using Equation (I). The calculated pressure difference across the substrates of the cell was 17 atm at a temperature of 60° C., and reached 42 atm at a temperature of 120° C.

Predictive Example 2

An LC cell having a pressure relief region formed by the elimination of spacer ribs for a span of 10 mm adjacent the edge seal, as depicted in FIG. 2, was modeled using Equation (I). The calculated pressure difference across the substrates of the cell was $8.9 \times 10^{-5}$ atm at a temperature of 60° C., and reached $2.2 \times 10^{-4}$ atm at a temperature of 120° C. This reflects a decrease in the pressure of five orders of magnitude when compared with the result in Predictive Example 1, where the pressure relief region is omitted.

Predictive Example 3

An LC cell similar to Predictive Example 2, but having a pressure relief region formed by creating a rectangular recess on the interior surface of one of the flexible substrates, as shown in FIG. 3, was modeled using Equation (III). The rectangular recess had a depth of 8 μm (i.e., the cell gap in this region was 12.5 μm) and extended the length of the pressure relief region. The calculated pressure within the cell was $1.0 \times 10^{-4}$ atm at a temperature of 60° C., and $2.6 \times 10^{-4}$ atm at a temperature of 120° C. This reflects a decrease in the pressure of five orders of magnitude when compared with the result in Predictive Example 1, where the pressure relief region is omitted. Additionally, the geometry in this example is preferred over that shown in Predictive Example 2, since the opposing substrates in the pressure relief region are separated by a larger gap which permits lower temperature operation. As the temperature is decreased below the seal temperature, the substrates flex inward to relieve the pressure difference across the cell. Upon contact of the two substrates, the pressure relief function is decreased. Therefore, a larger separation of the two substrates in the pressure relief region increases the lower limit of temperature to which the cell can be exposed before bubble formation occurs within the LC material.

Predictive Example 4

An LC cell similar to Predictive Example 3, but having second rectangular depression formed on the exterior surface of the flexible substrate to reduce the thickness of the substrate in the pressure relief region, as illustrated in FIG. 4, was modeled using Equation (IV). The reduced thickness of the substrate in the pressure relief region, $t_r$, was 0.05 mm. The calculated pressure within the cell was $2.3 \times 10^{-5}$ atm at a temperature of 60° C., and $5.8 \times 10^{-5}$ atm at a temperature of 120° C.

What is claimed is:

1. A liquid crystal display having an active area for displaying information and an inactive area adjacent the active area, the display comprising:

first substrate and a second substrate, at least one of said substrates being flexible, said substrates being affixed to each other at their peripheries; and a plurality of spacer members disposed between said substrates and defining a cavity therein for introduction of a liquid crystal material, each of said spacer members being individually affixed to both first and second substrates in the active area and at most one of said substrates within the inactive area;

wherein said at least one flexible substrate has a pressure relief region located within the inactive region of said liquid crystal display, and wherein flexure of the flexible substrate in the pressure relief region serves to relieve pressure generated within the liquid crystal display.

2. The display of claim 1, wherein said at least one flexible substrate is thinner in the pressure relief region than in the active region.

3. The display of claim 1, wherein a portion of the flexible substrate in the pressure relief region is configured to define a depression.

4. The display of claim 3, wherein the depression has a rectangular cross-section.

5. The display of claim 3, wherein the depression has a curvilinear cross-section.

6. The display of claim 3, wherein the depression is formed on the surface of said at least one flexible substrate opposite the cavity of the display.

7. The display of claim 3, wherein the depression is formed on the surface of said at least one flexible substrate facing the cavity of the display.

8. The display of claim 7, further including a second depression formed on the surface of said at least one flexible substrate facing away from the display cavity, at least a portion of said second depression being disposed opposite said depression facing the cavity of the display.

9. A liquid crystal display having an interior and an exterior, comprising:
first and second substrates, each having two major surfaces, one of said surfaces being an inner surface adjacent the interior of the display and the other surface being an outer surface adjacent the exterior of the display, each of said substrates having a uniform thickness in an active area of the display where information is displayed, at least one of said substrates being flexible, said inner surfaces of said first and second substrates being affixed to each other along their periphery; and a plurality of protrusions, provided on and extending over the inner surface of said first substrate, defining cavities between adjacent protrusions for the introduction of a liquid crystal material, said protrusions having tops defining a planar surface essentially parallel to the outer surface of said first substrate;

wherein:
said second substrate has a planar inner surface disposed adjacent to and affixed to the tops of the protrusions on said first substrate within said active area; and said at least one flexible substrate has a pressure relief region adjacent the active area of said liquid crystal display, wherein the thickness of the substrate in the pressure relief region is less than the thickness of the substrate in the active area.

10. The display of claim 9, wherein a portion of at least one of the inner and outer surfaces of said at least one flexible substrate in the pressure relief region is configured to define a depression.

11. The display of claim 10, wherein the depression has a rectangular cross-section.

12. The display of claim 10, wherein the depression has a curvilinear cross-section.

13. A liquid crystal display having an interior and an exterior, the display having an active area for displaying information and an inactive area adjacent the active area, the inactive area including a pressure relief region, the display comprising:
first and second substrates, each having two major surfaces, one of said surfaces being an inner surface adjacent the interior of the display and the other surface being an outer surface adjacent the exterior of the display, each of said substrates having a uniform thickness in an active area of the display where information is displayed, and at least one of said substrates being flexible;

a plurality of protrusions extending over the inner surface of said first substrate defining cavities between adjacent protrusions for the introduction of a liquid crystal material, said protrusions having tops defining a planar surface essentially parallel to said outer surface, said second substrate having a planar inner surface disposed adjacent to and affixed to the top surface of each of the protrusions on said first substrate within said active area; and an edge spacing member for separating said substrates by a distance greater than the heights of the protrusions, disclosed adjacent said inner surfaces of said first and second substrates, located on an edge of the display opposite said active area;

wherein the display has a first gap, $g_1$, in the active area and a second gap, $g_2$, in the inactive area at said edge of the display opposite said active area, where $g_2 > g_1$, when the display is assembled with an edge seal along the peripheries of the substrates.

14. A liquid crystal display having an interior and an exterior, the display having an active area for displaying information and an inactive area adjacent the active area, the inactive area including a pressure relief region, the display comprising:
first and second substrates, each having two major surfaces, one of said surfaces being an inner surface adjacent the interior of the display and the other surface being an outer surface adjacent the exterior of the display, each of said substrates having a uniform thickness in an active area of the display where information is displayed, each of said substrates being flexible, said inner surfaces of said first and second substrates being affixed to each other along their periphery; and a plurality of protrusions provided on and extending over the inner surface of said first substrate, defining cavities between adjacent protrusions for the introduction of a liquid crystal material, said protrusions having tops defining a planar surface essentially parallel to the outer surface of said first substrate;

wherein said second substrate has a planar inner surface disposed adjacent to and affixed to the tops of the protrusions on said first substrate within said active area, said second substrate having a pressure relief region adjacent the active area of said liquid crystal display, wherein the thickness of the substrate in the pressure relief region is less than the thickness of the substrate in the active area.

15. The display of claim 14, wherein a portion of at least one of the inner and outer surfaces of said second substrate in the pressure relief region is configured to define a depression.

16. The display of claim 15, wherein the depression has a rectangular cross-section.

17. The display of claim 15, wherein the depression has a curvilinear cross-section.

* * * * *